US011599568B2

(12) United States Patent
Fauber

(10) Patent No.: US 11,599,568 B2
(45) Date of Patent: Mar. 7, 2023

(54) MONITORING AN ENTERPRISE SYSTEM UTILIZING HIERARCHICAL CLUSTERING OF STRINGS IN DATA RECORDS

(71) Applicant: EMC IP Holding Company LLC, Hopkinton, MA (US)

(72) Inventor: Benjamin Fauber, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 498 days.

(21) Appl. No.: 16/776,126

(22) Filed: Jan. 29, 2020

(65) Prior Publication Data

US 2021/0232616 A1   Jul. 29, 2021

(51) Int. Cl.
*G06F 16/35* (2019.01)
*G06F 16/901* (2019.01)
*G06F 21/55* (2013.01)
*G06Q 30/018* (2023.01)

(52) U.S. Cl.
CPC ........ *G06F 16/355* (2019.01); *G06F 16/9024* (2019.01); *G06F 21/552* (2013.01); *G06Q 30/018* (2013.01); *G06F 2221/031* (2013.01)

(58) Field of Classification Search
CPC .. G06F 16/355; G06F 16/9024; G06F 21/552; G06F 2221/031; G06Q 30/018
USPC ...................................................... 707/739
See application file for complete search history.

(56) References Cited

U.S. PATENT DOCUMENTS

| 7,194,471 | B1 * | 3/2007 | Nagatsuka | ............ G06F 16/355 |
| 9,740,368 | B1 * | 8/2017 | Love | ................... G06F 3/04817 |
| 2006/0242140 | A1 * | 10/2006 | Wnek | .................... G06K 9/622 |
|  |  |  |  | 707/999.005 |
| 2011/0106807 | A1 * | 5/2011 | Srihari | .................. G06F 16/288 |
|  |  |  |  | 707/E17.046 |

(Continued)

OTHER PUBLICATIONS

Jaya Sreevalsan-Nair et al., "NodeTrix-CommunityHierarchy: Techniques for Finding Hierarchical Communities for Visual Analytics of Small-World Networks", 2017, VISIGRAPP (Year: 2017).*

(Continued)

*Primary Examiner* — Hosain T Alam
*Assistant Examiner* — Robert F May
(74) *Attorney, Agent, or Firm* — Ryan, Mason & Lewis, LLP

(57) ABSTRACT

An apparatus includes a processing device configured to obtain data records associated with an enterprise system comprising strings associated with an attribute. The processing device is also configured to generate a similarity matrix with entries comprising values characterizing similarity between respective pairs of the strings. The processing device is further configured to apply a thresholding filter to values in the entries of the similarity matrix to create an adjacency matrix, and to construct a graph network of the data records based at least in part on the adjacency matrix, wherein the graph network comprises edges connecting pairs of the data records. The processing device is further configured to perform a clustering operation on the graph network to identify clusters of the data records for the attribute, and to initiate remedial action in the enterprise system responsive to identifying a given cluster comprising a given subset of the data records.

20 Claims, 14 Drawing Sheets

(56) References Cited

U.S. PATENT DOCUMENTS

| | | | | |
|---|---|---|---|---|
| 2014/0344279 | A1* | 11/2014 | Shah | G06F 40/284 |
| | | | | 707/738 |
| 2015/0331936 | A1* | 11/2015 | Alqadah | G06F 16/313 |
| | | | | 707/739 |
| 2017/0078315 | A1* | 3/2017 | Allen | H04L 63/1433 |
| 2017/0111245 | A1* | 4/2017 | Ishakian | G06Q 10/0633 |
| 2019/0095472 | A1* | 3/2019 | Griffith | G06F 16/256 |
| 2019/0158525 | A1* | 5/2019 | Rostami-Hesarsorkh | |
| | | | | G06F 21/566 |
| 2020/0112574 | A1* | 4/2020 | Koral | H04L 61/4511 |

OTHER PUBLICATIONS

X. Wang, "Toward Scalable Hierarchical Clustering and Co-clustering Methods: Application to the Cluster Hypothesis in Information Retrieval," Technology for Human Learning, Doctoral Dissertation Université de Lyon, Nov. 29, 2017, 175 pages.

J. Sreevalsan-Nair et al., "NodeTrix-CommunityHierarchy: Techniques for Finding Hierarchical Communities for Visual Analytics of Small-world Networks," International Joint Conference on Computer Vision, Imaging and Computer Graphics Theory and Applications, Feb. 27-Mar. 1, 2017, 11 pages.

A. Backurs et al., "Edit Distance Cannot Be Computed in Strongly Subquadratic Time (unless SETH is false)." Proceedings of the Forty-seventh Annual ACM Symposium on Theory of Computing, Jun. 14-17, 2015, pp. 51-58.

S. Bandyopadhyay et al., "Unsupervised Classification: Similarity Measures, Classical and Metaheuristic Approaches, and Applications." Springer Verlag: Berlin Heidelberg, 2013, pp. 59-74.

A.-L. Barabási et al., "Network Biology: Understanding the Cell's Functional Organization." Nature Reviews Genetics, Feb. 2004, 15 pages.

A.-L. Barabási et al., "Network Medicine: A Network-based Approach to Human Disease." Nature Reviews Genetics, Jan. 2011, pp. 13 pages.

P. W. Battaglia et al., "Relational Inductive Biases, Deep Learning, and Graph Networks." Oct. 17, 2018, arxiv:1806.01261v3, 40 pages.

M. Bilenko et al., "Learning to Combine Trained Distance Metrics for Duplicate Detection in Databases." Technical Report AI 02 296, Artificial Intelligence Lab, The University of Texas at Austin, 2002, 19 pages.

M. Bilenko et al., "Adaptive Name Matching in Information Integration." IEEE Intell. Syst. 2003, 8 pages.

E. Otte et al., "Social Network Analysis: A Powerful Strategy, also for the Information Sciences." Journal of Information Science, 2002, vol. 28, No. 6, pp. 441-453.

V. D. Blondel et al., "Fast Unfolding of Communities in Large Networks." Jul. 25, 2008, arXiv:0803.0476v2, 12 pages.

W. W. Cohen et al., "A Comparison of String Metrics for Matching Names and Records." Proceedings of the 2003 International Conference on Information Integration on the Web, Aug. 2003, 6 pages.

T. H. Cormen et al., "Introduction to Algorithms." Massachusetts Institute of Technology Press: Cambridge, Massachusetts, 2009; 3rd ed., pp. 43-64, 591.

P. Christen, "A Comparison of Personal Name Matching: Techniques and Practical Issues." Technical Report TR CS 06 02, Department of Computer Science, The Australian National University, Canberra, Australia, 2002, 5 pages.

S. H. Strogatz, "Exploring Complex Networks." Nature, Mar. 8, 2001, pp. 268-276.

S. Fortunato et al., "Community Detection in Networks: A User Guide." Nov. 3, 2016, arXiv:1608.00163v2, 43 pages.

G. Navarro, "A Guided Tour to Approximate String Matching." ACM Computing Surveys, Mar. 2001, vol. 33, No. 1, pp. 31-88.

V. I. Levenshtein, "Binary Codes Capable of Correcting Deletions, Insertions, and Reversals." Soviet Physics—Doklady, Feb. 1966, vol. 10, No. 8, pp. 707-710.

H. Small, "Co-citation in the Scientific Literature: A New Measure of the Relationship Between Two Documents." Journal of the American Society for Information Science, Jul.-Aug. 1973, pp. 265-269.

A. Marzal et al., "Computation of Normalized Edit Distance and Applications." IEEE Transactions on Pattern Analysis and Machine Intelligence, Sep. 1993, vol. 15, No. 9, pp. 926-932.

J. Betten, "Creep Mechanics." Springer Verlag: Berlin, 2005; pp. 248-252.

C. D. Manning et al., "Introduction to Information Retrieval." Cambridge University Press, New York, NY, 2008, 581 pages.

L. Ramalho, "Fluent Python: Clear, Concise, and Effective Programming." O'Reilly Media, Inc., Sebastopol, CA, 2015, 766 pages.

W. E. Winkler, "Overview of Record Linkage and Current Research Directions." Technical Report, Statistical Research Division, U. S. Census Bureau, Washington, DC, 2006, 44 pages.

M. A. Jaro, "Advances in Record-Linkage Methodology as Applied to Matching the 1985 Census of Tampa, Florida." J. Am. Stat. Assoc. Jun. 1989, vol. 84, No. 406, pp. 414-420.

G. Govaert et al., "Co-Clustering: Models, Algorithms and Applications." John Wiley & Sons, Inc.: Hoboken, New Jersey, 2014, 243 pages.

U.S. Appl. No. 16/826,562 filed in the name of Benjamin Fauber on Mar. 23, 2020, and entitled "Monitoring Information Processing Systems Utilizing Co-Clustering Of Strings in Different Sets of Data Records."

* cited by examiner

| MAILING ADDRESS | CLUSTER NUMBER |
|---|---|
| 1 Dell Way rr2 onstie lab Round Rock TX 78682 | 91 |
| 501 Dell Way RR2 IT Onsite Lab9350 Round Rock Texas 78682 | 91 |
| 501 Dell Way RR2 Onsite Lab Round Rock TX 78682 | 91 |
| 501 Dell Way RR2C Onsite Lab Round Rock TX 78682 | 91 |
| 501 Dell Way RR2E IT Onsite Lab Round Rock TX 78682 | 91 |

| n STRINGS | SUT EDIT DISTANCE CALCULATIONS (s) | THRESHOLDING FILTER (s) | GRAPH NETWORK (s) | COMMUNITY DETECTION (s) | TOTAL WALL TIME (s) |
|---|---|---|---|---|---|
| 10 | 0.001 | 0.001 | 0.001 | 0.01 | 0.013 |
| 100 | 0.084 | 0.002 | 0.001 | 0.02 | 0.107 |
| 1,000 | 7 | 0.028 | 0.013 | 0.22 | 7.26 |
| 10,000 | 696 | 2.7 | 1.2 | 3.2 | 703 |
| 100,000 | 70,061 | | | | |

MONITORING AN ENTERPRISE SYSTEM UTILIZING HIERARCHICAL CLUSTERING OF STRINGS IN DATA RECORDS

FIELD

The field relates generally to information processing, and more particularly to techniques for managing data.

BACKGROUND

In many information processing systems, graph networks are used to provide rich compositional or contextual information. A graph network may include a plurality of nodes and edges or links connecting the nodes, with the edges or links representing relationships between the nodes. To construct a graph network, therefore, there is a need to define explicit relationships between the nodes. Each of the nodes in a graph network may represent a data record, which can comprise strings of unstructured text data. Unstructured text data typically requires special treatment, such as manual screening or manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present disclosure provide techniques for monitoring an enterprise system utilizing hierarchical clustering of strings in data records associated with the enterprise system.

In one embodiment, an apparatus comprises at least one processing device comprising a processor coupled to a memory. The at least one processing device is configured to perform the step of obtaining a plurality of data records associated with an enterprise system, each of the plurality of data records comprising at least one string associated with at least one attribute. The at least one processing device is also configured to perform the step of generating at least one similarity matrix for the strings associated with the at least one attribute, wherein entries of the at least one similarity matrix comprise values characterizing similarity between respective pairs of the strings associated with the at least one attribute. The at least one processing device is further configured to perform the steps of applying a thresholding filter to values in the entries of the at least one similarity matrix to create at least one adjacency matrix and constructing at least one graph network of the plurality of data records based at least in part on the at least one adjacency matrix, wherein the at least one graph network comprises edges connecting pairs of the plurality of data records based at least in part on values of entries in the at least one adjacency matrix. The at least one processing device is further configured to perform the steps of performing at least one clustering operation on the at least one graph network to identify one or more clusters of the plurality of data records for the at least one attribute and initiating remedial action in the enterprise system responsive to identifying a given cluster comprising a given subset of the plurality of data records.

These and other illustrative embodiments include, without limitation, methods, apparatus, networks, systems and processor-readable storage media.

BRIEF DESCRIPTION OF THE DRAWINGS

FIG. 6 shows a table illustrating clustering of U.S. mailing addresses in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
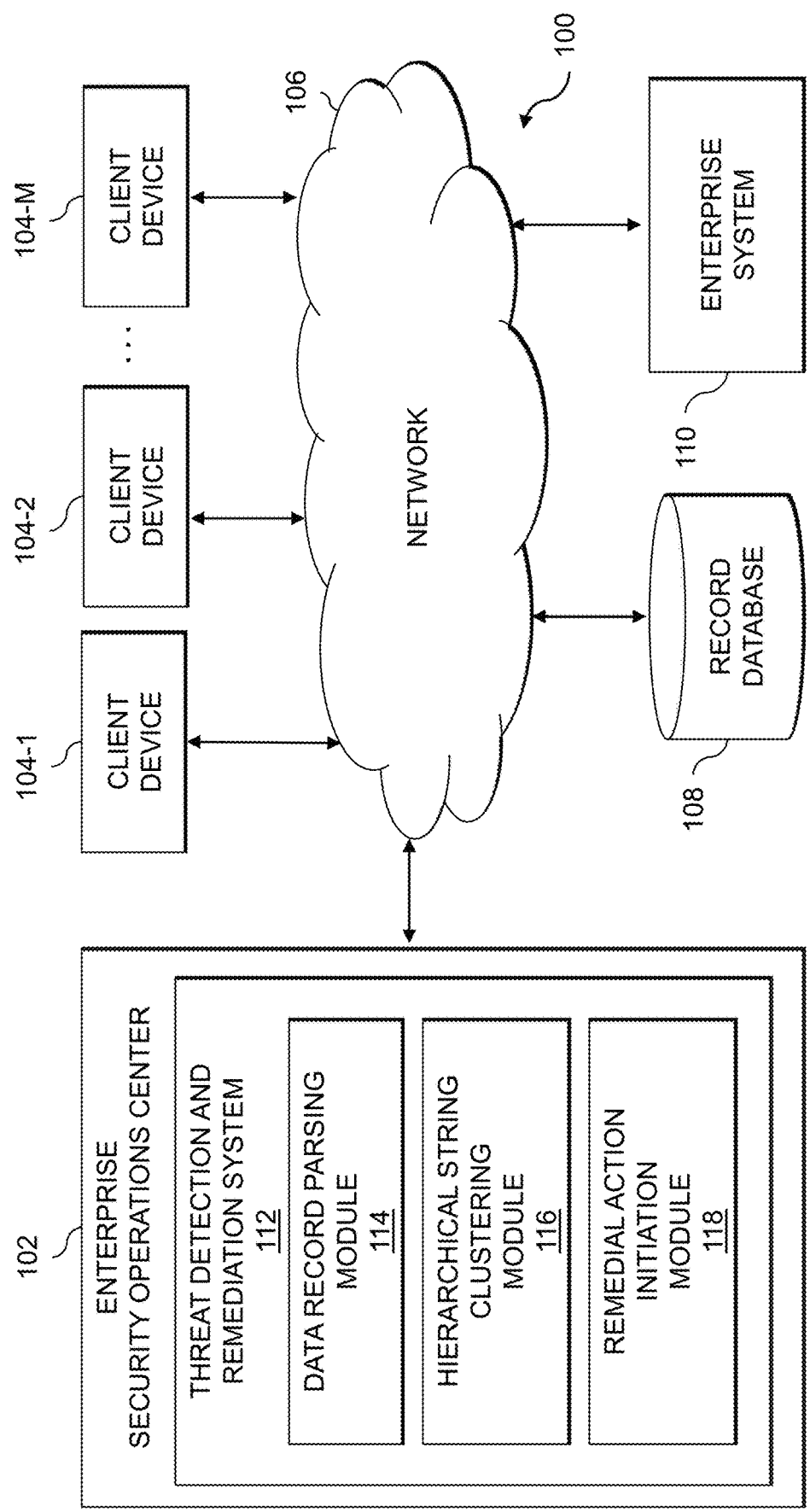
FIG. 1 is a block diagram of an information processing system for monitoring an enterprise system utilizing hierarchical clustering of strings in an illustrative embodiment.

FIG. 1 shows an information processing system 100 configured in accordance with an illustrative embodiment. The information processing system 100 is assumed to be built on at least one processing platform and provides functionality for monitoring an enterprise system 110 utilizing hierarchical clustering of strings contained in data records associated with the enterprise system 110. As used herein, an "enterprise system" includes a system associated with at least one enterprise. Thus, in some embodiments, the enterprise system 110 may be associated with or include portions of two or more enterprises or other entities. The information processing system 100 includes a security operations center (SOC) 102, which is coupled via a network 106 to the enterprise system 110. The enterprise system 110, or assets of an information technology (IT) infrastructure associated therewith, is assumed to be accessed, over the network 106, by client devices 104-1, 104-2, . . . 104-M (collectively, client devices 104). The assets of the IT infrastructure may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), software containers (also referred to herein as containers), etc. The assets of the enterprise system 110 are assumed to produce logs or other data records (either directly, or via monitoring tools monitoring such assets). Such logs or data records, or information derived therefrom, are stored in record database 108 as described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The record database 108, as discussed above, is configured to store and record information relating to the enterprise system 110, such as a plurality of data records where each data record includes one or more strings (e.g., unstructured text data) associated with one or more attributes. The data records may include, for example, logs of interactions between users of the client devices 104 and the enterprise system 110.

The record database 108 in some embodiments is implemented using one or more storage systems or devices associated with the SOC 102 or the enterprise system 110. In some embodiments, one or more of the storage systems utilized to implement the record database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the SOC 102, the client devices 104, the record database 108, and the enterprise system 110, as well as to support communication between the SOC 102, client devices 104, record database 108, enterprise system 110 and other related systems and devices not explicitly shown.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given host agent may comprise a mobile telephone equipped with a mobile application configured to receive alerts from the enterprise SOC 102 or the threat detection and remediation system 112 and to provide an interface for the host agent to select particular remedial measures for responding to the alert or notification. Examples of such remedial measures may include blocking access by one or more of the client devices 104 to the enterprise system 110 or assets thereof, requiring user input or authentication by the client devices 104 to obtain information from or otherwise utilize one or more resources or assets of the enterprise system 110, triggering further review of the enterprise system 104 or resources or assets thereof, etc. Further examples of remedial measures or actions will be described below.

It should be noted that a "host agent" as this term is generally used herein may comprise an automated entity, such as a software entity running on a processing device. Accordingly, a host agent need not be a human entity.

As shown in FIG. 1, the enterprise SOC 102 comprises threat detection and remediation system 112. As will be described in further detail below, the threat detection and remediation system 112 is configured to monitor enterprise system 110 utilizing hierarchical string clustering of data records associated with the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a data record parsing module 114, a hierarchical string clustering module 116, and a remedial action initiation module 118.

The data record parsing module 114 is configured to obtain a plurality of data records associated with the enterprise system 110 (e.g., directly from assets in an IT infrastructure associated with the enterprise system 110, from monitoring tools associated with the enterprise system 110, from the record database 108, etc.). The data record parsing module 114 is further configured to identify strings (e.g., of unstructured text data) that are associated with one or more attributes of interest (e.g., that are to be clustered and analyzed). For example, each data record may include two strings, a first string associated with a mailing address and a second string associated with a name.

The hierarchical string clustering module 116 is configured to generate at least one similarity matrix for the strings associated with the at least one attribute (e.g., one for each attribute of interest). Entries of the at least one similarity matrix comprise values characterizing similarity between respective pairs of the strings associated with the at least one attribute. The hierarchical string clustering module 116 is also configured to apply a thresholding filter to values in the entries of the at least one similarity matrix to create at least one adjacency matrix (e.g., one for each similarity matrix), and to construct at least one graph network of the plurality of data records (e.g., one for each adjacency matrix). The at least one graph network comprises edges connecting pairs of the plurality of data records based at least in part on values of entries in the at least one adjacency matrix. The hierarchical string clustering module 116 is further configured to perform at least one clustering operation on the at least one graph network to identify one or more clusters of the plurality of data records for the at least one attribute (e.g., to identify clusters for each attribute).

The remedial action initiation module 118 is configured to initiate at least one remedial action in the enterprise system 110 responsive to identifying a given cluster comprising a given subset of the plurality of data records. The type of remedial action depends on the attributes and data records being analyzed. For example, if the data records are associated with users accessing assets of the enterprise system 110, the remedial action may include blocking user access to assets or monitoring subsequent user access to assets responsive to the identified clusters indicating suspicious access patterns. The data records may alternatively be associated with assets of the enterprise system 110, and the remedial action may include applying security hardening procedures to assets or modifying the configuration of the assets responsive to the identified clusters indicating suspicious access patterns or other activity.

It is to be appreciated that the particular arrangement of the SOC 102, the threat detection and remediation system 112, the data record parsing module 114, the hierarchical string clustering module 116, and the remedial action initiation module 118 illustrated in the FIG. 1 embodiment is presented by way of example only, and alternative arrangements can be used in other embodiments. As discussed above, for example, the threat detection and remediation system 112, or portions thereof such as one or more of the data record parsing module 114, the hierarchical string clustering module 116, and the remedial action initiation module 118 may in some embodiments be implemented internal to one or more of the client devices 104 or the enterprise system 110. As another example, the functionality associated with the data record parsing module 114, the hierarchical string clustering module 116, and the remedial action initiation module 118 may be combined into one module, or separated across more than three modules with the multiple modules possibly being implemented with multiple distinct processors or processing devices.

At least portions of the data record parsing module 114, the hierarchical string clustering module 116, and the remedial action initiation module 118 may be implemented at least in part in the form of software that is stored in memory and executed by a processor.

It is to be understood that the particular set of elements shown in FIG. 1 for monitoring the enterprise system 110 utilizing hierarchical clustering of strings in data records associated with the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The SOC 102 and other portions of the system 100 may be part of cloud infrastructure as will be described in further detail below. The cloud infrastructure hosting the SOC 102 may also host one or more of the client devices 104 or at least a portion of the enterprise system 110.

The SOC 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The SOC 102, client devices 104, record database 108 and enterprise system 110 or components thereof may be implemented on respective distinct processing platforms, although numerous other arrangements are possible. For example, in some embodiments at least portions of the SOC 102 and one or more of the client devices 104 or enterprise system 110 are implemented on the same processing platform. A given one of the client devices 104 or the enterprise system 110 can therefore be implemented at least in part within at least one processing platform that implements at least a portion of the SOC 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the SOC 102, client devices 104, record database 108 and enterprise system 110, or portions or components thereof, to reside in different data centers. Numerous other distributed implementations are possible. The SOC 102 or portions thereof can also be implemented in a distributed manner across multiple data centers.

Additional examples of processing platforms utilized to implement the SOC 102 and other portions of the system 100 in illustrative embodiments will be described in more detail below in conjunction with FIGS. 12 and 13.

It is to be appreciated that these and other features of illustrative embodiments are presented by way of example only, and should not be construed as limiting in any way.

Figure 2:
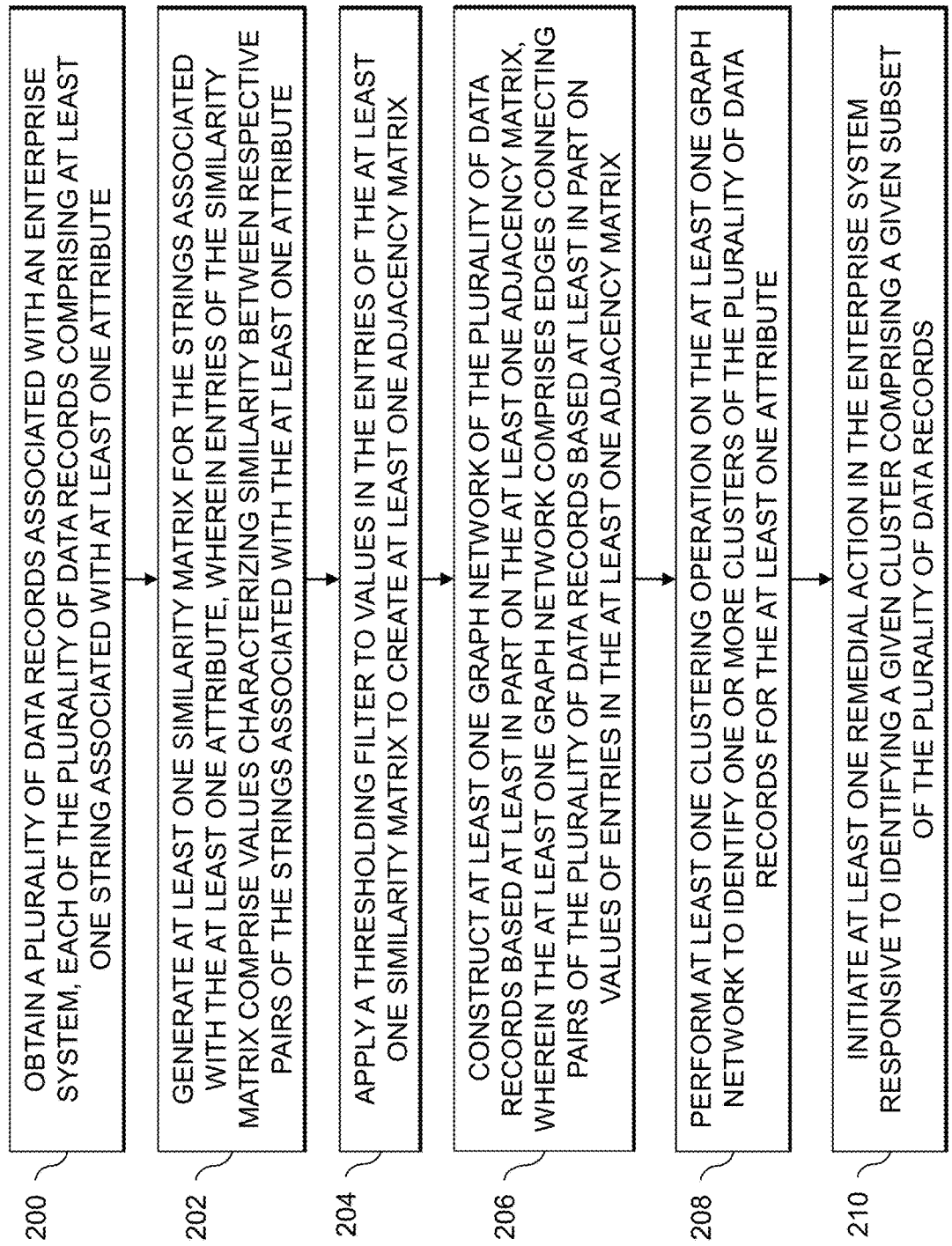
FIG. 2 is a flow diagram of an exemplary process for monitoring an enterprise system utilizing hierarchical clustering of strings in an illustrative embodiment.

An exemplary process for monitoring an enterprise system utilizing hierarchical clustering of strings in data records associated with the enterprise system will now be described in more detail with reference to the flow diagram of FIG. 2. It is to be understood that this particular process is only an example, and that additional or alternative processes for monitoring an enterprise system utilizing hierarchical clustering of strings in data records associated with the enterprise system may be used in other embodiments.

In this embodiment, the process includes steps 200 through 210. These steps are assumed to be performed by the threat detection and remediation system 112 of the SOC 102 utilizing the data record parsing module 114, the hierarchical string clustering module 116, and the remedial action initiation module 118. The process begins with step 200, obtaining a plurality of data records associated with an enterprise system (e.g., enterprise system 110). The data records may be obtained by monitoring the enterprise system, or from a record database (e.g., record database 108) associated with the enterprise system. Each of the plurality of data records comprises at least one string associated with at least one attribute. In some embodiments, as described in further detail below, each of the data records includes two or more strings associated with two or more different attributes (e.g., a first string that is a mailing address, and a second string that is a name).

In step 202, at least one similarity matrix is generated for the strings associated with the at least one attribute. In some embodiments, multiple similarity matrices are generated (e.g., one for each attribute of interest). Entries of the at least one similarity matrix comprise values characterizing similarity between respective pairs of the strings associated with the at least one attribute. Generating the similarity matrix comprises performing string similarity calculations for pairs of the strings. The string similarity calculations may comprise one or more edit distance calculations, such as a Levenshtein edit distance calculation, a Jaro-Winkler edit distance calculation, etc.

A thresholding filter is applied to values in the entries of the at least one similarity matrix to create at least one adjacency matrix in step 204. In step 206, at least one graph network of the plurality of data records is constructed based at least in part on the at least one adjacency matrix. The at least one graph network comprises edges connecting pairs of the plurality of data records based at least in part on values of entries in the at least one adjacency matrix. The thresholding filter may comprise a shifted Heaviside unit step function. Applying the thresholding filter in step 204 may comprise setting entries of the at least one similarity matrix with values below a designated threshold to a first value and setting entries of the at least one similarity matrix with values at or above the designated threshold to a second value. Constructing the at least one graph network in step 206 may comprise connecting pairs of the plurality of data records having entries in the adjacency matrix with the second value, and refraining from connecting pairs of the plurality of data records having entries in the adjacency matrix with the first value.

In step 208, at least one clustering operation is performed on the at least one graph network to identify one or more clusters of the plurality of data records for the at least one attribute. The at least one clustering operation may include performing community detection on the at least one graph network, such as utilizing a Louvain community detection algorithm. Remedial action is initiated in the enterprise system in step 210 responsive to identifying a given cluster comprising a given subset of the plurality of data records. The plurality of data records may be associated with a plurality of assets of an IT infrastructure associated with the enterprise system, the plurality of assets comprising at least one of physical and virtual computing resources in the IT infrastructure. The remedial action may comprise at least one of applying one or more security hardening procedures to one or more of the plurality of assets associated with the given subset of the plurality of data records in the given cluster, and modifying a configuration of one or more of the plurality of assets associated with the given subset of the plurality of data records in the given cluster. The plurality of data records may alternatively be associated with a plurality of users of the enterprise system, and the remedial action may comprise at least one of blocking access, by one or more of the plurality of users associated with the given subset of the plurality of data records in the given cluster, to one or more of a plurality of assets of the enterprise system, and monitoring subsequent access, by one or more of the plurality of users associated with the given subset of the plurality of data records in the given cluster, to one or more of the plurality of assets of the enterprise system.

As discussed above, in some embodiments each of the plurality of data records comprises multiple strings associated with multiple attributes, such as a first string associated with a first attribute and a second string associated with a second attribute. In such embodiments, step 202 may include generating a first similarity matrix for the first strings associated with the first attribute and a second similarity matrix for the second strings associated with the second attribute, and step 204 may include applying a first thresholding filter to values in entries of the first similarity matrix to generate a first adjacency matrix and applying a second thresholding filter to values in entries of the second similarity matrix to generate a second adjacency matrix (e.g., where the first and second thresholding filters may utilize different thresholds). Step 206 may include constructing a first graph network based at least in part on the first adjacency matrix and constructing a second graph network based at least in part on the second adjacency matrix, and step 208 may include identifying a first set of one or more clusters of the plurality of data records in the first graph network for the first attribute and identifying a second set of one or more clusters of the plurality of data records in the second graph network for the second attribute. Step 210 may be responsive to identifying a given one of the plurality of data records that is in a first cluster with a first subset of the plurality of data records for the first attribute and is in a second cluster with a second subset of the plurality of data records for the second attribute.

Hierarchical clustering of strings may be used for unsupervised pattern recognition in various application areas, including in named entity recognition, record alignment, anomaly detection, etc. Some embodiments utilize and benefit from the correspondence of similarity and adjacency matrices to implement a hierarchical string clustering algorithm. String similarity calculations are housed within a similarity matrix, and the similarity matrix is subjected to a thresholding filter to create an adjacency matrix. The resulting adjacency matrix is equivalent to a graph network, which may be subjected to a community detection algorithm to provide hierarchical clusters of string inputs. Advantageously, the community detection algorithm is able to do so with reasonable overall computational wall times and with favorable cluster contents.

Graph networks are sets of vertices or nodes that are connected by edges or links. Graph networks include, but are not limited to, co-citation networks, social networks, biological networks, etc. Graph networks can provide rich compositional and contextual information. In addition, graph networks create unique opportunities for contextual data analysis that are not present in the analysis of tabular data. For example, social network data sets may explicitly specify the relationships (e.g., edges, links) of the entities (e.g., nodes) within a graph. Such relationships may be defined a priori by the users of the social network. Many tabular data sets, in contrast, do not provide pre-defined connections or edges between data points.

Inferring sparse structure from unstructured data is a challenging task. Unsupervised pattern recognition methods, such as hierarchical clustering, may make use of a similarity metric (e.g., Euclidean distance) to infer structure from unstructured data. In some embodiments, various edit distance calculations are used to generate string similarity metrics for inferring structure from unstructured text string data. Such edit distance calculations include, but are not limited to, Levenshtein edit distance and Jaro-Winkler edit distance calculations. The resulting similarity metrics are utilized in a hierarchical clustering algorithm.

Various embodiments are described below in the context of an exemplary use case, namely, the assignment of approximate string similarity metrics to mailing address and name data (e.g., company name) for the purpose of record alignment. It should be appreciated, however, that this is just one example use case and that embodiments are not limited solely to hierarchical clustering of string data for the purpose of record alignment, or in the specific context of record alignment of mailing address and name data. In other embodiments, for example, the hierarchical clustering algorithms described herein may be used for monitoring access patterns by users to assets of an IT infrastructure, for monitoring log data associated with assets of an IT infrastructure, etc.

Levenshtein edit distance provides a method for programmatically analyzing the number of single-character insertions, deletions, and substitutions required to transform one string, or a sequence of strings, into another. The Levenshtein edit distance calculation is an example of what is more generally referred to herein as edit distance or an edit distance calculation. Edit distance calculations such as the Levenshtein edit distance calculation are useful for detecting string similarity in data sets (e.g., for U.S. mailing addresses). For example, the Levenshtein edit distance calculation may provide an optimal solution, relative to other approximate string similarity methods, given U.S. census data containing mailing addresses. It should be appreciated, however, that embodiments are not limited solely to use with the Levenshtein edit distance calculation. Various other edit distance calculations may be used as desired.

String matching of proper names and personal names can in some cases be more challenging than string matching for mailing addresses. Various similarity algorithms may be used, including the Jaro similarity metric or algorithm. The Jaro similarity algorithm has three components or steps: (i) computing the string lengths of two strings denoted $s_1$ and $s_2$; (ii) finding the number of common characters in the two strings $s_1$ and $s_2$; and (iii) finding the number of character transpositions. These components or steps may be combined as shown in the following equation:

$$\Phi_j(s_1, s_2) = \frac{1}{3}\left(\frac{N_C}{len_{s1}} + \frac{N_C}{len_{s2}} + \frac{N_t}{2N_c}\right)$$

where $len_{s1}$ is the length of string $s_1$, $len_{s2}$ is the length of string $s_2$, $N_c$ is the number of characters in common in the strings $s_1$ and $s_2$, and $N_t$ is the number of character transpositions.

Figure 3:
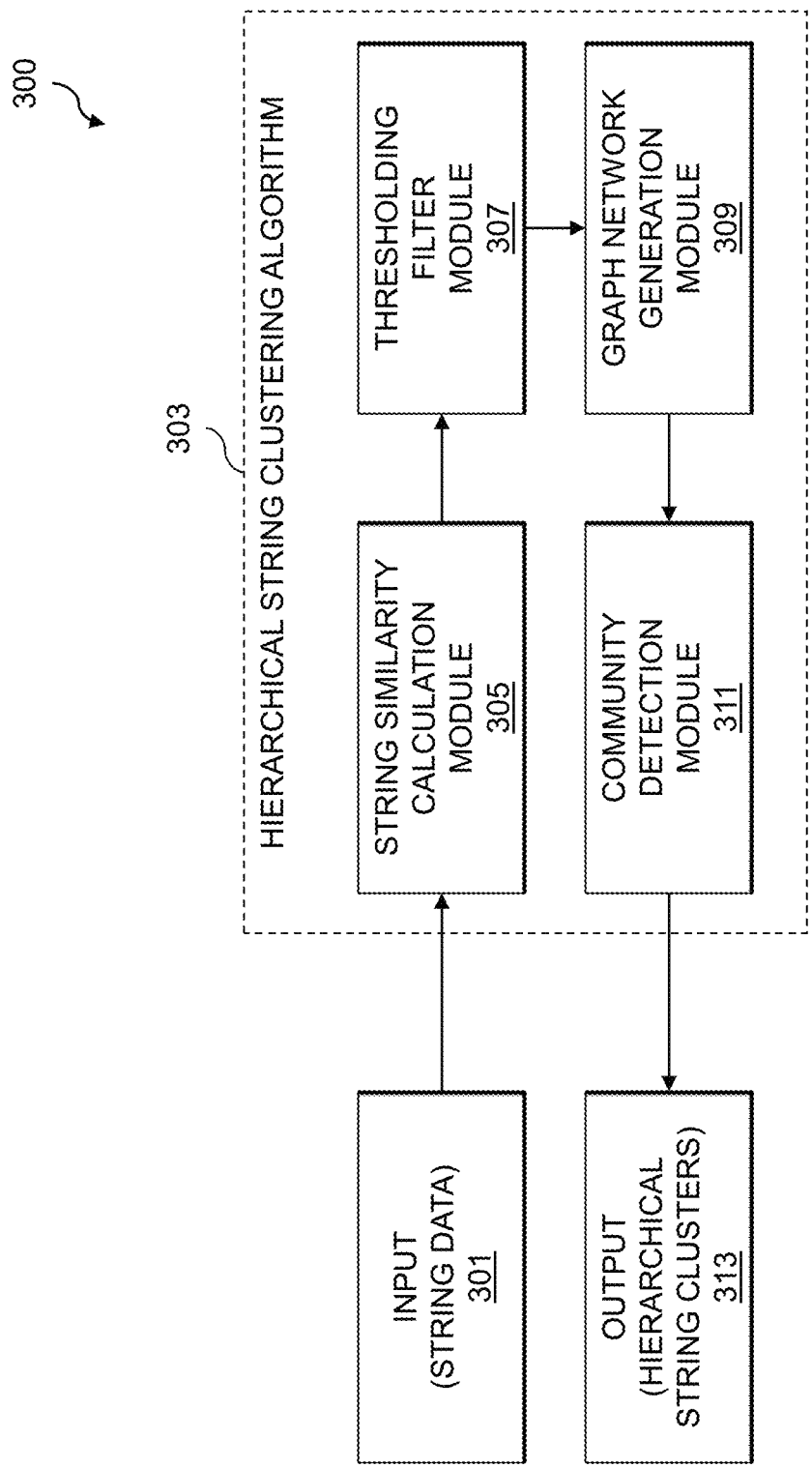
FIG. 3 illustrates a hierarchical string clustering system in an illustrative embodiment.

FIG. 3 shows a hierarchical string clustering system 300, where input 301 (e.g., string data) is provided to a hierarchical string clustering algorithm 303 implementing a string similarity calculating module 305, a thresholding filter module 307, a graph network generation module 309, and a community detection module 311. The hierarchical string clustering algorithm 303 provides as output 313 hierarchical string clusters. The string similarity calculation module 305 provides normalized similarity values or data that is subjected to a thresholding filter applied by the thresholding filter module 307. The output of the thresholding filter is passed into the graph network generation module 309 for further analysis with a generated graph network. Hierarchical clustering of the generated graph network, in some embodiments implemented as community detection via the community detection module 311, provides as output 313 hierarchical string clusters for the input 301. For example, hierarchical string clusters for mailing address data may be provided. Some embodiments take advantage of related structures of a similarity matrix (e.g., the output of the string similarity calculations in string similarity calculation module 305) and an adjacency matrix (e.g., the generated graph network produced by the graph network generation module 309). In such cases, the same matrix data structure may be used throughout the hierarchical string clustering algorithm.

Figure 4A:
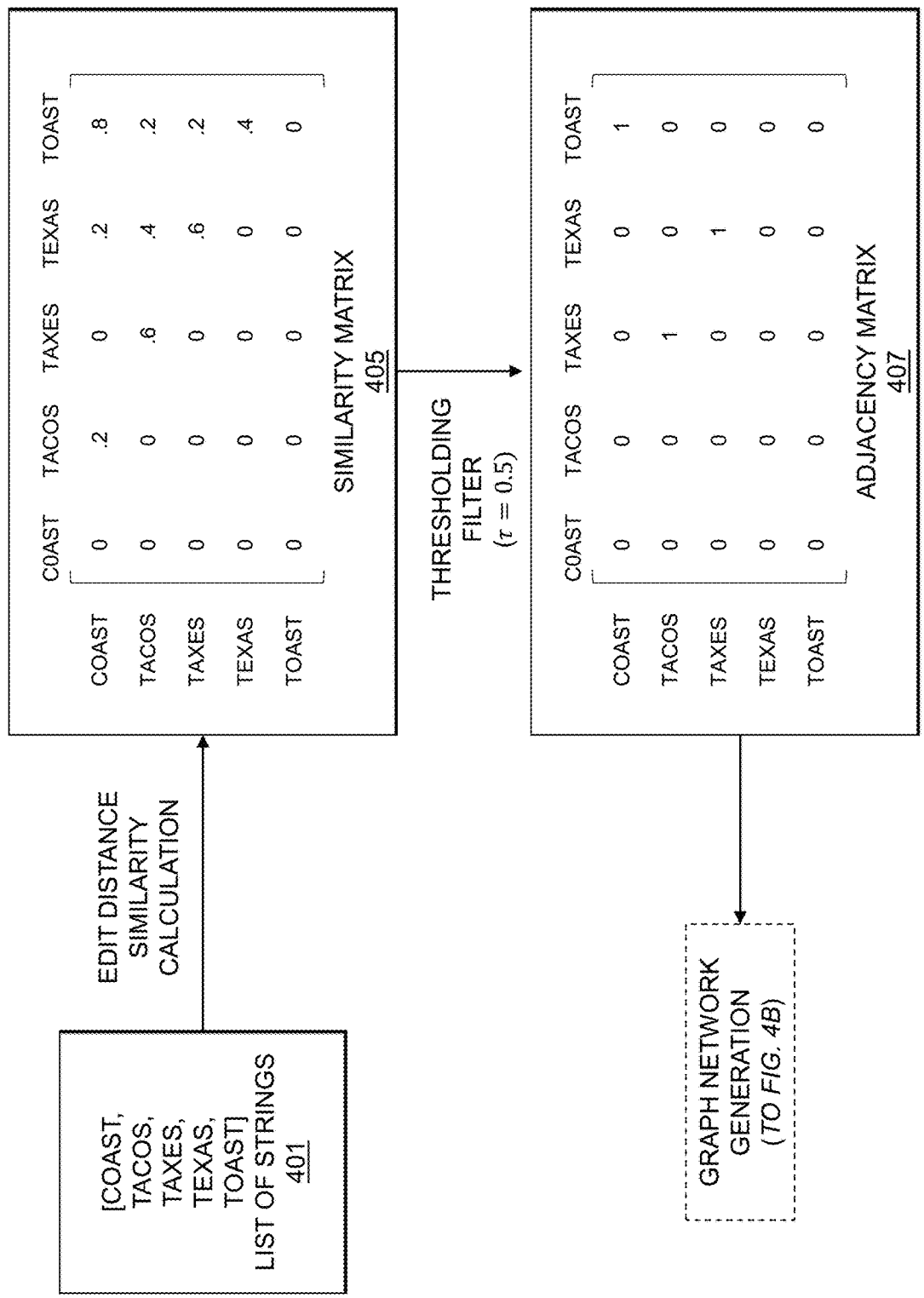
FIGS. 4A and 4B show an application of a hierarchical string clustering algorithm utilizing the FIG. 3 hierarchical string clustering system in an illustrative embodiment.
Figure 4B:
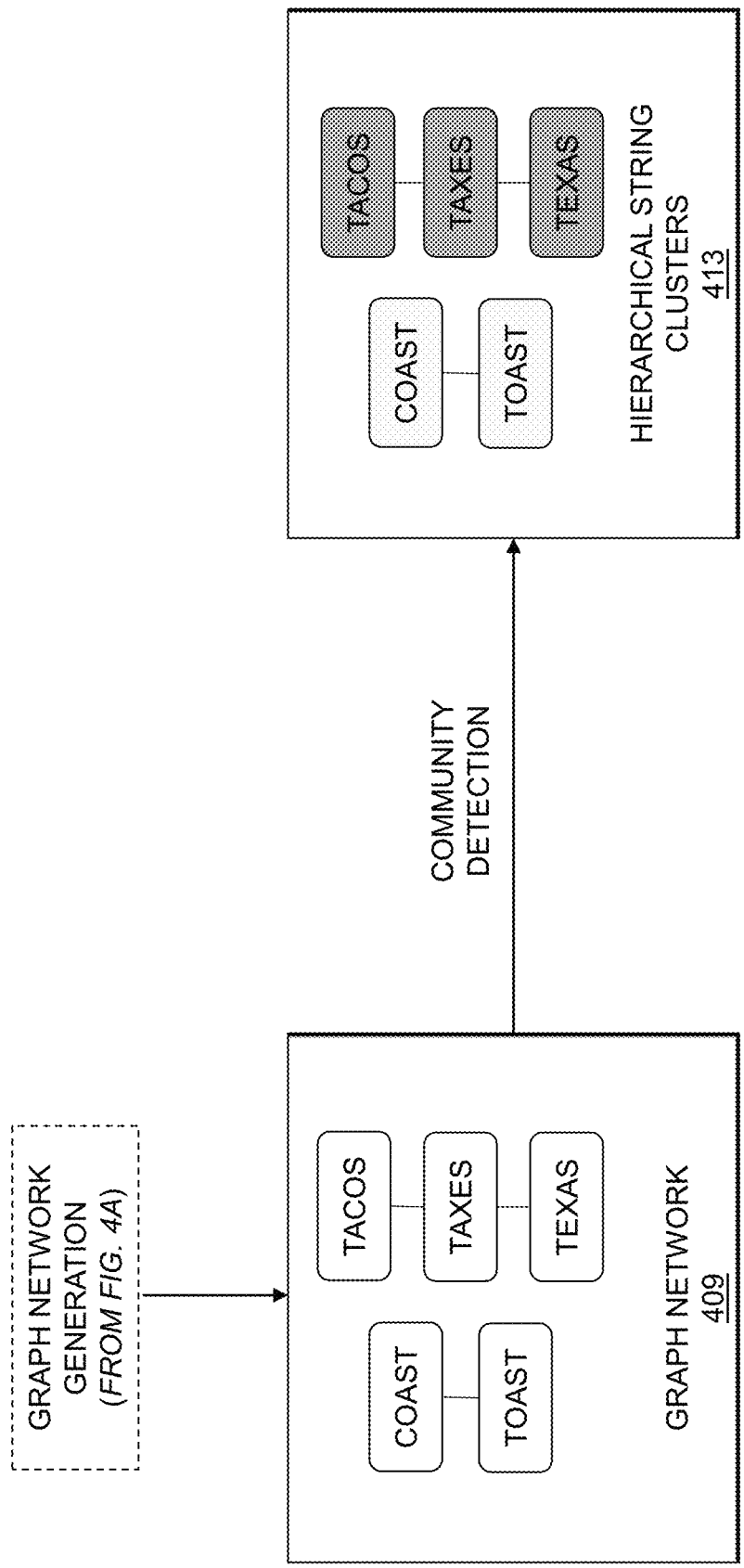

An example application of the hierarchical string clustering algorithm 303 will now be described with respect to FIGS. 4A and 4B. In the example of FIGS. 4A and 4B, the input 401 includes a list of five strings (coast, tacos, taxes, texas, toast). The list of strings 401 is input to the hierarchical clustering algorithm 303, and the string similarity calculation module 305 analyzes the strings using an edit distance calculation (e.g., Levenshtein edit distance) to produce similarity matrix 405. The thresholding filter module 307 applies a thresholding filter with a value τ=0.5 to produce the adjacency matrix 407. The graph network generation module 309 utilizes the adjacency matrix 407 to produce a graph network 409. The community detection module 311 analyzes the graph network 409 to produce as output 413 hierarchical string clusters. In this example, there are two hierarchical string clusters, shown shaded in light gray (e.g., coast-toast) and dark gray (e.g., tacos-taxes-texas) in output 413.

The hierarchical string clustering algorithm utilized in some embodiments will now be described in further detail. Let L denote a list containing strings l, where l∈L. In some embodiments, strings are case-normalized, excessive whitespace is removed, and special characters and diacritics are stripped prior to analysis. For example, U.S. mailing addresses may be standardized according to U.S. Postal Service postal addressing requirements. The cleaned text of each string may be tokenized and sorted prior to analysis.

Each l is compared against all l∈ L using a string similarity calculation (which may, in some embodiments, include combining the results of two or more string similarity calculations), to produce a similarity matrix S of dimension n×n containing the elements $s_{ij} \in S$, where $s_{ij} \geq 0$ indicates that the similarity of the strings at i and j, and where i and j are positive real integers≤n. The string similarity values $s_{ij}$ are normalized $s_{ij} \in [0,1]$, where $s_{ij}=1$ indicates identical strings. The diagonal $s_{ij}$ elements of S are equal to one as $s_{ij}=s_{ij} \in S$. The diagonal of S can thus also be expressed as an identity matrix $I_n$ of dimension n×n. It should be noted that it is not required to calculate all n×n strings in S. Instead, only the strictly upper triangle of S is required due to the inherent symmetry in S and the justification for the strictly upper triangle calculation described below.

An undirected simple graph G is defined as a pair (V, E) where $v_n \in V$ are nodes of the graph and e∈ E are the edges of the graph which connect the nodes. In a simple graph, where all edges connect distinct vertices, there can be at most one edge between a given pair of vertices, and there are no self-loops. Each e∈ E is an unordered pair of vertices, with the edge connecting distinct vertices a and b written as a pair (a, b). Graph G is also defined by an adjacency matrix A of dimension n×n containing the elements $a_{ij} \in A$, where $a_{ij}=1$ if $v_i$ and $v_j$ share an edge, and where $a_{ij}=0$ otherwise:

$$a_{ij} = \begin{cases} 1 \text{ if } (i, j) \in E \\ 0 \text{ if } (i, j) \notin E \end{cases}$$

A of G is symmetrical about the diagonal of A, and the diagonal elements of A are zeros (e.g., $a_{ij}=0$ when i=j), when G is an undirected simple graph. The strictly upper triangle of A (e.g., diagonal elements of A are all zeros and all elements below the diagonal are zeros) is the mirror image of the strictly lower triangle of A. Thus, in the undirected simple graph G the strictly upper triangle of A is sufficient to represent G. As described herein, S is employed to fulfill the requirements for A and therefore only the strictly upper triangle of S is required. Further, only calculating the strictly upper triangle of S simplified the calculation of S to $O(n^2/2-n/2)$ order. The triangular number of a n×n matrix is $(n^2/2+n/2)$. Subtracting the identity matrix $I_n$ (e.g., subtracting n) from the triangular number provides $(n^2/2-n/2)$.

A shifted Heaviside unit step function H[x] is applied to S as a thresholding filter. The threshold τ may be user-defined, such as setting τ∈[0,1] of the unit step function whereby $s_{ij}<\tau$ are reset to zero and $s_{ij} \geq \tau$ are reset to one when the thresholding filter was applied to S:

$$a_{ij} = \begin{cases} 1 \text{ if } s_{ij} \geq \tau \\ 0 \text{ if } s_{ij} < \tau \end{cases}$$

Figure 5:
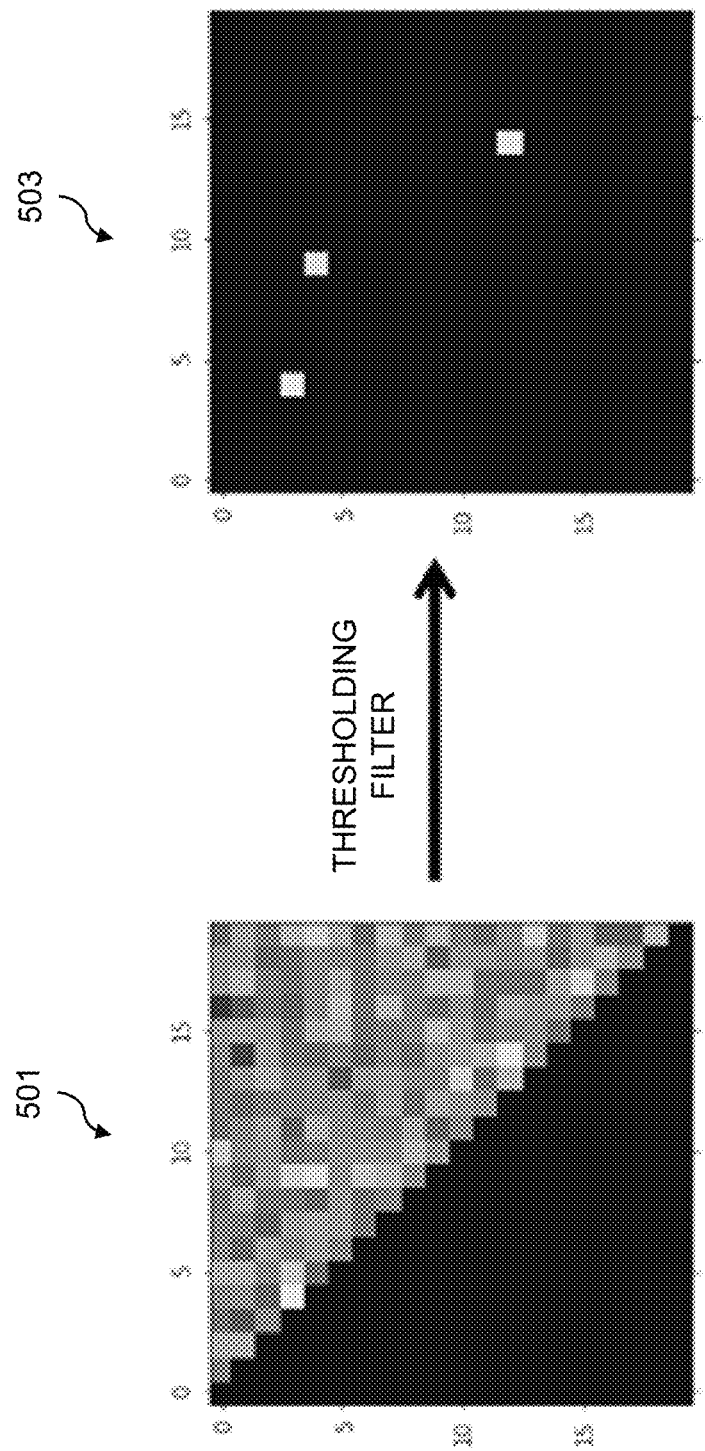
FIG. 5 shows heat maps illustrating application of a thresholding filter in an illustrative embodiment.

The thresholding filter is important, as in some embodiments H[S]=A. Adjacency matrix A contains E of G, therefore greater τ values decrease E, whereas lower τ values increase E, essentially providing a hyperparameter for graph coarsening. In some embodiments, 0.8≤τ≤0.9 provides favorable outcomes. FIG. 5 illustrates heat maps 501 and 503 of S and A, illustrating H[S]=A, where n=20, $s_{ij},a_{ij}=0$ are represented in dark gray and $s_{ij},a_{ij}=1$ are represented in light gray, and $0 \leq s_{ij} \leq 1$.

Application of the thresholding filter H[S] provides A, which results in G. Hierarchical graph clustering of G, in some embodiments, may be achieved using the Louvain community detection algorithm. The Louvain community detection algorithm advantageously has decreased computational time as compared with other community detection algorithms while still providing high-quality results. As discussed above, the selection of the r value during the thresholding filter step impacts the hierarchical string clustering algorithm results. In some embodiments, 0.8≤τ≤0.9 is selected for the use case of hierarchical clustering of U.S. mailing addresses, though it should be appreciated that other values and value ranges may be used as desired.

FIG. 6 shows a table 600 illustrating examples of a set of U.S. mailing addresses that are assigned to a particular cluster (e.g., with cluster number 91) using the hierarchical string clustering algorithm described herein where τ=0.85 and n=10,000. The results for applying the hierarchical string clustering algorithm for mailing addresses provides various desired characteristics, including that subtle spelling errors in mailing addresses as well as the addition or deletion of small words or numbers within the full string are placed within the same cluster. Further, strings with single-character insertions, deletions, and substitutions were detected as approximate string matches by the hierarchical string clustering algorithm and are clustered together as illustrated in table 600.

Figure 7:
FIG. 7 shows a table illustrating calculation times for edit distance calculations in an illustrative embodiment.

The strictly upper triangular string similarity calculation used in some embodiments exhibits favorable results as the data set scales (e.g., from n=10 to 100,000 strings). An analysis of mailing addresses of n=10, 100, 1,000, 10,000, and 100,000 strings demonstrated decreased wall time when compared to the calculation of the full similarity matrix (e.g., $O(n^2)$ calculation) as shown in table 700 of FIG. 7. Table 700 shows the wall times of the strictly upper triangular (SUT) and quadratic edit distance calculations. Each string or n value had a mean length of 49 characters and 8 tokens per string (e.g., where the characters per string are: μ=49, σ=12, min=23, max=137, and tokens per string μ=8, σ=2, min=4, and max=9). Table 700 shows the mean of three different runs through the calculations for each n value.

At a macro level, the wall time for the strictly upper triangular edit distance calculation is approximately one-half of that required by the calculation of the full similarity matrix. This observed result was in line with the $O(n^2/2-n/2)$ and $O(n^2)$ order of each calculation, respectively. Additionally, the strictly upper triangular $O(n^2/2-n/2)$ string similarity calculation can be approximated as $O(n^2/2)$ for large n values, and it can be further approximated to $O(n^2)$ under infinite asymptotic conditions. Thus, the strictly upper triangular edit distance calculation provides an improvement over the full similarity matrix calculation in some cases, though it should be recognized that the approach is not strongly sub-quadratic.

Figure 8:
FIG. 8 shows a table illustrating calculation times for multiple steps of a hierarchical string clustering algorithm in an illustrative embodiment.

The wall time values for the other steps of the hierarchical string clustering algorithm also demonstrate improvements as detailed in table 800 of FIG. 8. The thresholding filter, graph network, and community detection steps contribute comparatively little to the total computational wall time of the hierarchical string clustering algorithm. Additionally, the total wall time for the hierarchical string clustering algorithm is faster than calculating the full similarity matrix alone, further demonstrating the efficiency achieved in some embodiments. Table 800 shows the wall time (in seconds, s) for each step of the hierarchical clustering algorithm utilizing the SUT string similarity matrix calculation. Each n value had a mean of 49 characters per string and a mean of 8 tokens per string. The values shown in the table 800 are a mean of three different runs through the calculations for each n value.

The hierarchical string clustering algorithms described herein provide an efficient approach, which may be used for clustering of mailing address and names, or other attributes in various other types of data sets. The application of similarity calculations to text strings enables construction of relationships between previously unstructured text data. The result of the string similarity calculations is a similarity matrix, which was subjected to a thresholding filter. The output of the thresholding filter step creates the adjacency matrix of a graph network. The resulting graph network is subjected to a community detection algorithm to provide hierarchical string clusters. Overall, the hierarchical string clustering algorithm demonstrates reasonable wall times in the use case of clustering of mailing addresses and company name data for up to 10,000 strings, with each string containing a mean of 49 characters and 8 tokens per string.

The hierarchical string clustering techniques described herein may be used in a wide variety of application areas. One such application area is in anomaly detection or other pattern recognition. For example, an enterprise system may provide services consumed by a set of users (e.g., users of the enterprise, customers of the enterprise, etc.). The enterprise system has a goal of delivering quality services in a timely manner, and thus may seek to monitor user activity for anomalies or other patterns. In some embodiments, for example, the enterprise system may seek to monitor user activity to detect abnormal behavior. The abnormal behavior may be a result of problems in service delivery, technical issues with services provided to the users, misuse of the services provided to the users (e.g., indicative of fraudulent activity), etc.

Consider, as an example, hierarchical string clustering applied to warranty data for services offered by an enterprise system. The hierarchical string clustering algorithm may be applied to analyze user profiles for approximate string matches to determine if a particular user has, for example, submitted frequent and similar (but not the same) information or requests while seeking warranty or other services offered by the enterprise system. The approximate string match information may be combined with other database information to create a graph network of the users of such services, which is analyzed for high degrees of connectivity indicative of abnormal behavior. The graph network illustratively provides insights and connectivity information that is not immediately available from unstructured string data.

Figure 9:
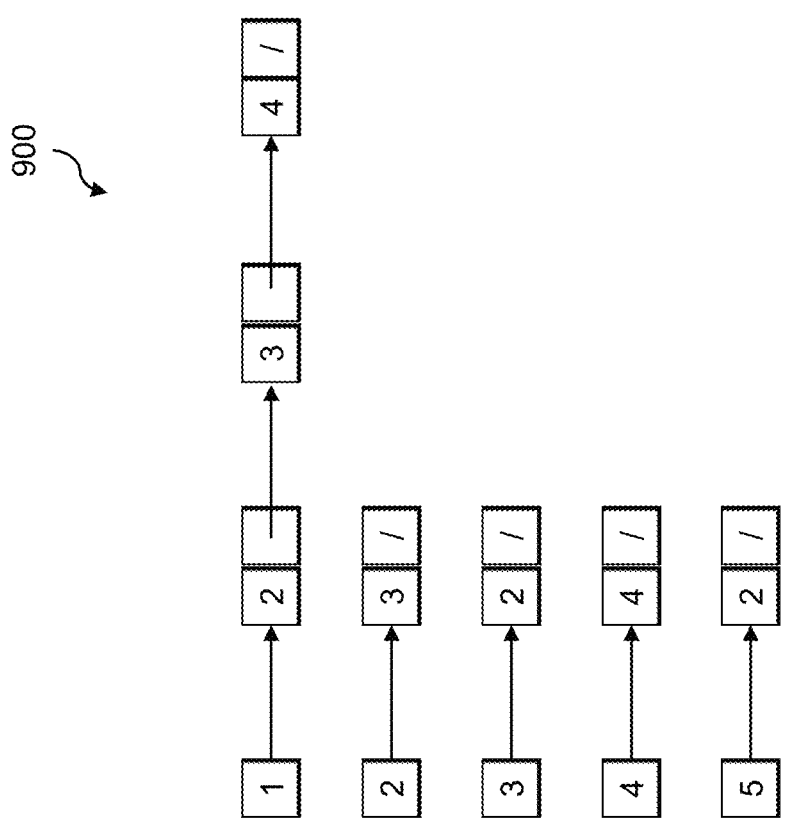
FIG. 9 shows an adjacency list constructed utilizing approximate string matching in an illustrative embodiment.
Figure 10:
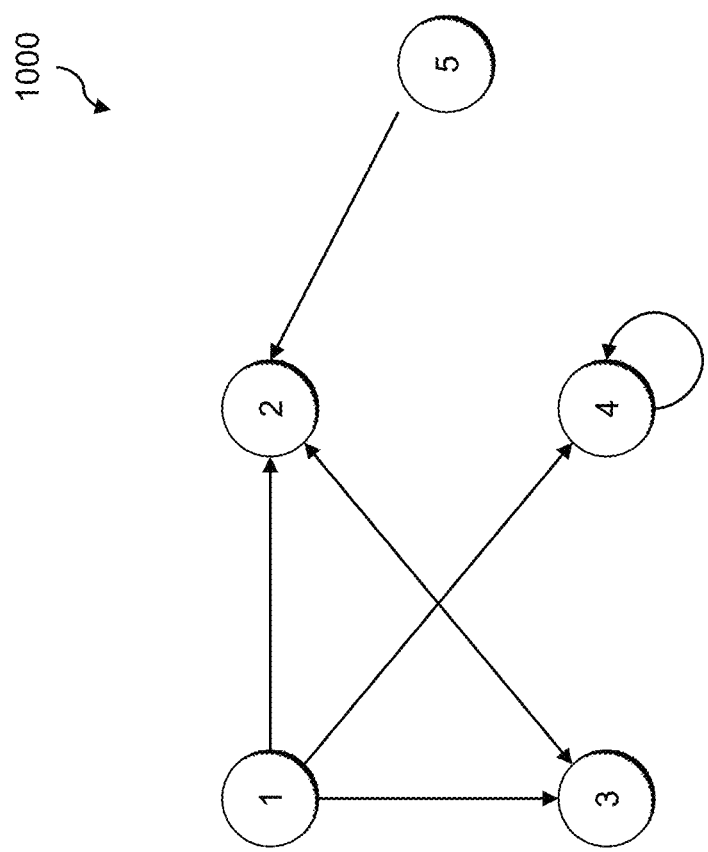
FIG. 10 shows a graph network constructed utilizing the FIG. 9 adjacency list in an illustrative embodiment.
Figure 11:
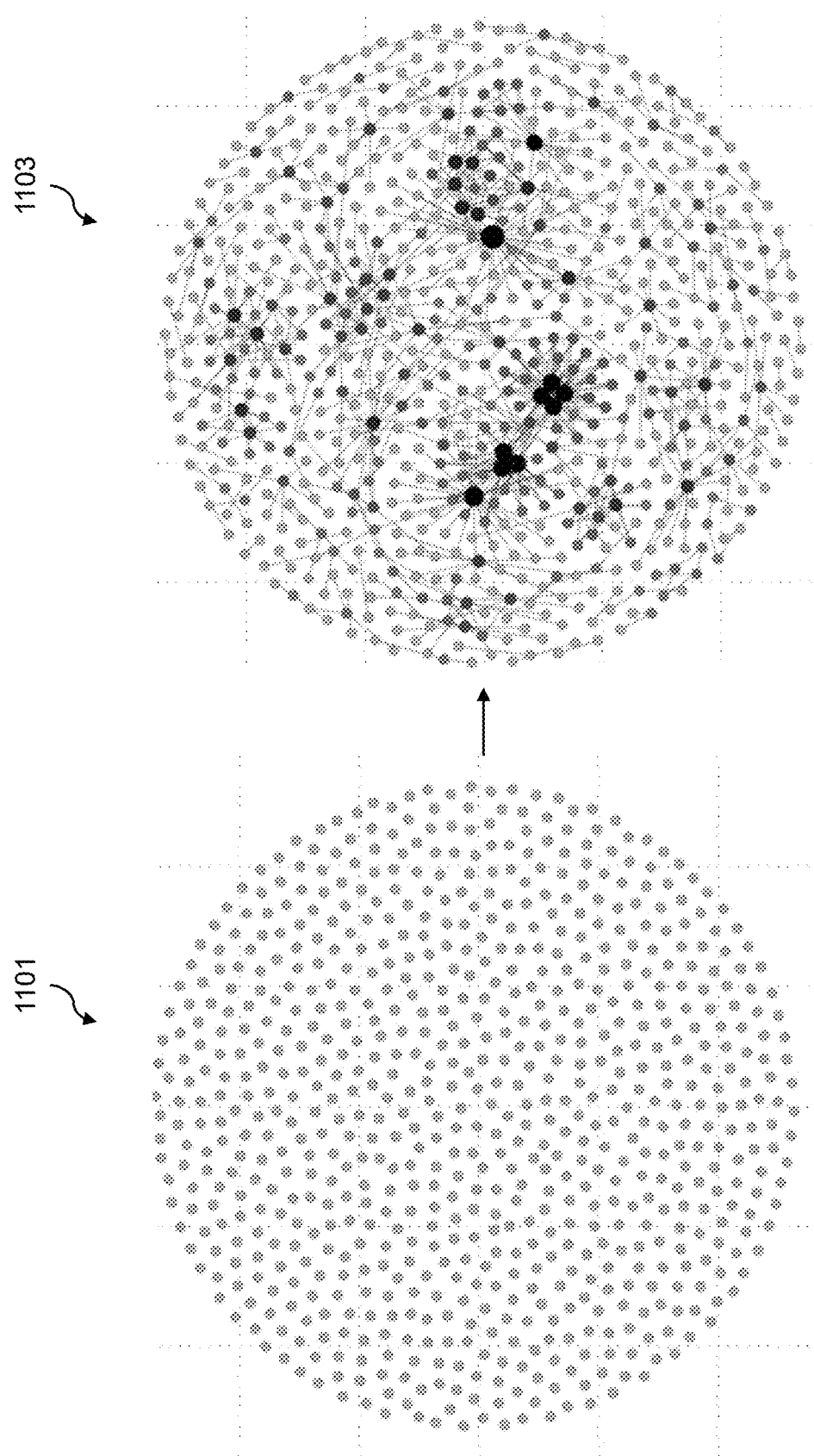
FIG. 11 shows a graph network before and after application of a hierarchical string clustering algorithm in an illustrative embodiment.

FIG. 9 illustrates an adjacency list 900 constructed using approximate string matches. FIG. 10 illustrates a graph network 1000 constructed utilizing the adjacency list 900, where the approximate string matches create the sparse adjacency matrix edges of the graph network 1000. FIG. 11 illustrates a more detailed view of a graph network, before and after hierarchical string clustering. FIG. 11 shows a view 1101 of data comprising a plurality of nodes (e.g., represented as gray circles) with no defined connections, network or relationships. After application of the hierarchical string clustering techniques described herein, the view 1101 may be converted to the view 1103 with connections among the plurality of nodes (e.g., edges) allowing construction of the graph network. Different shadings of gray in the view 1103 indicate highly-connected nodes in the graph network. The size of the nodes in the view 1103 are also based on the degree of connectivity (e.g., where higher degrees of connectivity result in larger nodes). In the FIG. 11 example, the nodes with a high degree of connectivity may correspond to users of an enterprise system that are exhibiting abnormal behavior. In the view 1103, the edges are not directional, and self-loops are omitted (e.g., the view 1103 provides an undirected simple graph network). In other embodiments, however, it may be desired to use directed edges or incorporate self-loops.

Abnormal behavior may also be detected by comparing multiple graph networks with one another. User data may be available for multiple attributes, and a graph network may be created for each of the multiple attributes. Anomalies may be detected by considering situations in which a particular user or other data point is in a first cluster for a first attribute but a second cluster for a second attribute. Consider, as an example, user data that has a first attribute of a U.S. mailing address and a second attribute of name (e.g., a company name). If a given user is in a first cluster for U.S. mailing address that does not match a second cluster for name, this may be indicative of an anomaly. This information may be used to initiate various remedial action as desired, such as analyzing user data to determine if there is fraudulent or suspicious activity (e.g., utilizing multiple names with the same U.S. mailing address, or the same mailing address being associated with multiple different names). It should be noted, however, that an anomaly is not necessarily associated with fraudulent or suspicious activity. An office building, for example, may be associated with a cluster of U.S. mailing addresses (e.g., with different floor numbers, suite numbers, etc.) that are associated with many different names (e.g., of workers in such different offices). In other instances, however, the anomaly may be associated with suspicious behavior, such as where the same or similar name is submitting service requests for many different addresses, or where the same or similar address is associated with service requests for multiple different names.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for monitoring an enterprise system utilizing hierarchical clustering of strings in data records associated with the enterprise system will now be described in greater detail with reference to FIGS. 12 and 13. Although described in the context of system 100, these platforms may also be used to implement at least portions of other information processing systems in other embodiments.

Figure 12:
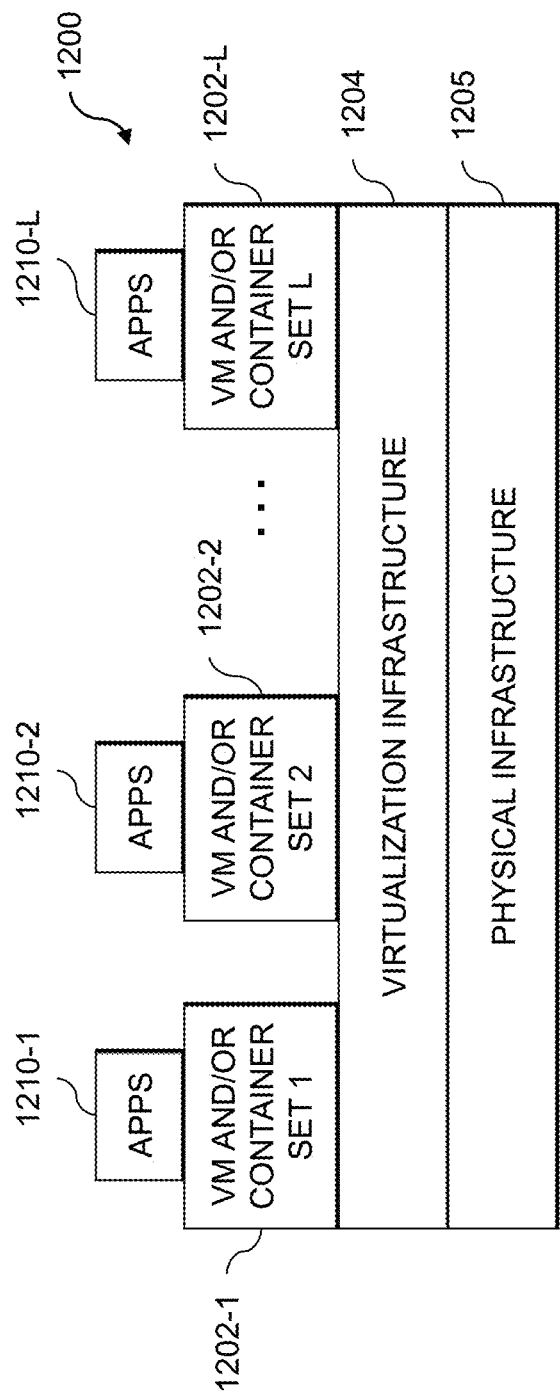
FIGS. 12 and 13 show examples of processing platforms that may be utilized to implement at least a portion of an information processing system in illustrative embodiments.
Figure 13:
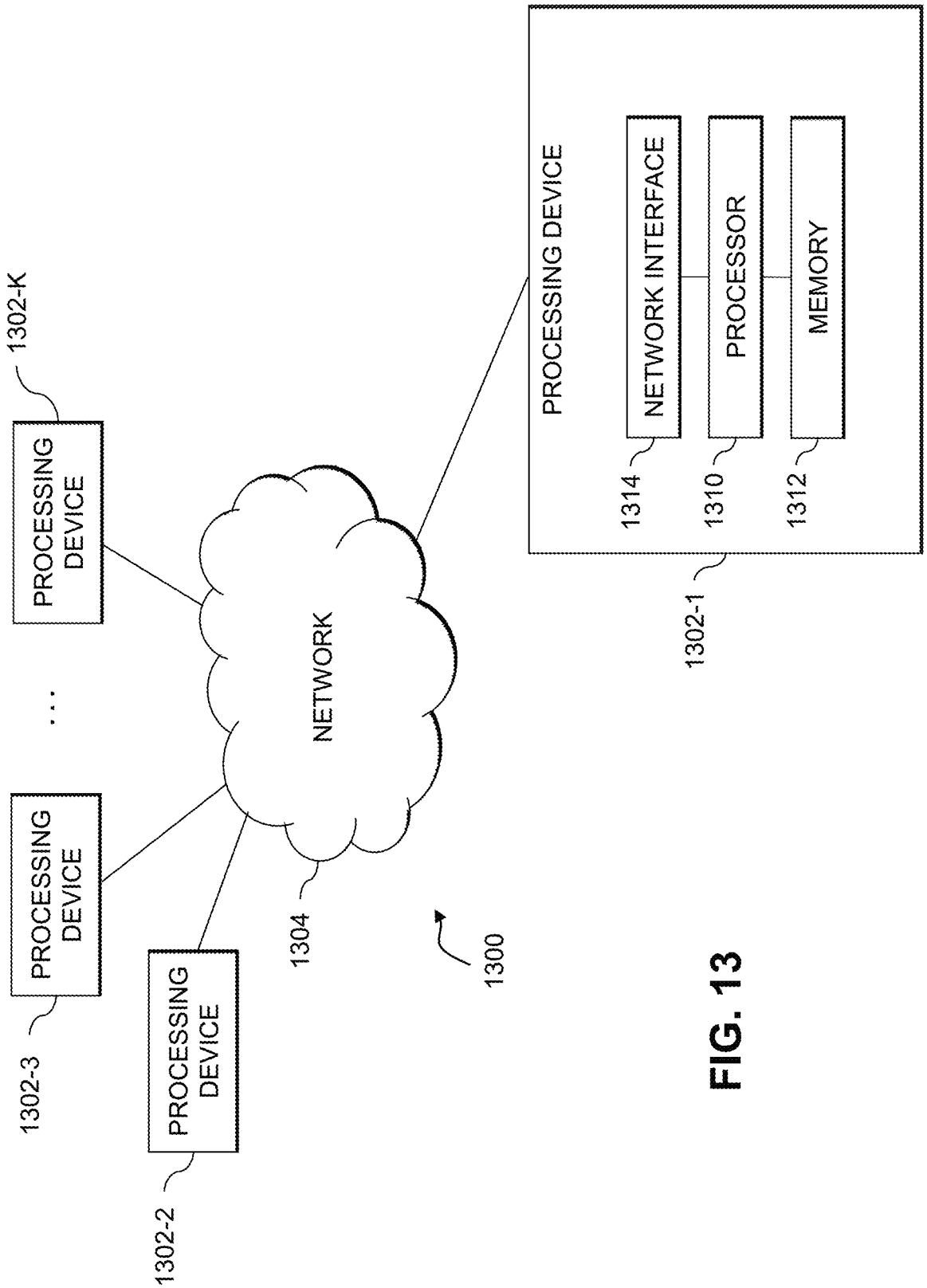

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for monitoring an enterprise system utilizing hierarchical clustering of strings in data records associated with the enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data records, attributes, string similarity calculations, thresholding filters, community detection algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining a plurality of data records associated with an information technology infrastructure, each of the plurality of data records comprising at least one string associated with at least one attribute;

generating at least one similarity matrix for the strings associated with the at least one attribute, wherein entries of the at least one similarity matrix comprise values characterizing similarity between respective pairs of the strings associated with the at least one attribute;

applying a thresholding filter to values in the entries of the at least one similarity matrix to create at least one adjacency matrix;

constructing at least one graph network of the plurality of data records based at least in part on the at least one adjacency matrix, wherein the at least one graph network comprises edges connecting pairs of the plurality of data records based at least in part on values of entries in the at least one adjacency matrix;

performing at least one clustering operation on the at least one graph network to identify one or more clusters of the plurality of data records for the at least one attribute;

determining a degree of connectivity of a given one of the one or more clusters, the degree of connectivity of the given cluster being determined based at least in part on similarity of string values in two or more of the plurality of data records that are part of the given cluster; and initiating at least one remedial action on one or more information technology assets of the information technology infrastructure responsive to determining that the degree of connectivity of the given cluster exceeds a designated connectivity threshold.

2. The apparatus of claim 1 wherein generating the at least one similarity matrix comprises performing string similarity calculations for pairs of the strings.

3. The apparatus of claim 2 wherein the string similarity calculations comprise one or more edit distance calculations.

4. The apparatus of claim 3 wherein the one or more edit distance calculations comprises at least one of a Levenshtein edit distance calculation and a Jaro-Winkler edit distance calculation.

5. The apparatus of claim 1 wherein the thresholding filter comprises a shifted Heaviside unit step function.

6. The apparatus of claim 1 wherein applying the thresholding filter comprises setting entries of the at least one similarity matrix with values below a designated threshold to a first value and setting entries of the at least one similarity matrix with values at or above the designated threshold to a second value.

7. The apparatus of claim 6 wherein constructing the at least one graph network comprises connecting pairs of the plurality of data records having entries in the at least one adjacency matrix with the second value, and refraining from connecting pairs of the plurality of data records having entries in the at least one adjacency matrix with the first value.

8. The apparatus of claim 1 wherein performing the at least one clustering operation comprises performing community detection on the at least one graph network to identify the one or more clusters of the plurality of data records for the given attribute, the community detection algorithm comprising a Louvain community detection algorithm.

9. The apparatus of claim 1 wherein the one or more information technology assets of the information technology infrastructure comprise at least one of physical and virtual computing resources in the information technology infrastructure, and wherein initiating the at least one remedial action in the enterprise system comprises at least one of:

applying one or more security hardening procedures to at least one of the one or more information technology assets associated with a given subset of the plurality of data records in the given cluster; and modifying a configuration of at least one of the one or more information technology assets associated with the given subset of the plurality of data records in the given cluster.

10. The apparatus of claim 1 wherein the plurality of data records are associated with a plurality of users of the information technology infrastructure, and wherein initiating the at least one remedial action comprises at least one of:

blocking access, by one or more of the plurality of users associated with a given subset of the plurality of data records in the given cluster, to at least one of the one or more information technology assets of the information technology infrastructure, the one or more information technology assets of the information technology infrastructure comprising at least one of physical and virtual computing resources; and monitoring subsequent access, by one or more of the plurality of users associated with the given subset of the plurality of data records in the given cluster, to at least one of the one or more information technology assets of the information technology infrastructure.

11. The apparatus of claim 1 wherein each of the plurality of data records comprises a first string associated with a first attribute and a second string associated with a second attribute.

12. The apparatus of claim 11 wherein:

generating the at least one similarity matrix comprises generating a first similarity matrix for the first strings associated with the first attribute and a second similarity matrix for the second strings associated with the second attribute;

applying the thresholding filter to values in the entries of the at least one similarity matrix to create the at least one adjacency matrix comprises applying a first thresholding filter to values in entries of the first similarity matrix to generate a first adjacency matrix and applying a second thresholding filter to values in entries of the second similarity matrix to generate a second adjacency matrix; and constructing the at least one graph network of the plurality of data records based at least in part on the at least one adjacency matrix comprises constructing a first graph network based at least in part on the first adjacency matrix and constructing a second graph network based at least in part on the second adjacency matrix.

13. The apparatus of claim 11 wherein:

the at least one graph network comprises a first graph network for the first attribute and a second graph network for the second attribute;

performing the at least one clustering operation on the at least one graph network comprises identifying a first set of one or more clusters of the plurality of data records in the first graph network for the first attribute and identifying a second set of one or more clusters of the plurality of data records in the second graph network for the second attribute; and initiating the at least one remedial action is further responsive to identifying a given one of the plurality of data records that is in a first cluster with a first subset of the plurality of data records for the first attribute and is in a second cluster with a second subset of the plurality of data records for the second attribute.

14. The apparatus of claim 13 wherein the first attribute comprises a mailing address and the second attribute comprises a name.

15. A computer program product comprising a non-transitory processor-readable storage medium having stored therein program code of one or more software programs, wherein the program code when executed by at least one processing device causes the at least one processing device to perform steps of:
obtaining a plurality of data records associated with an information technology infrastructure, each of the plurality of data records comprising at least one string associated with at least one attribute;
generating at least one similarity matrix for the strings associated with the at least one attribute, wherein entries of the at least one similarity matrix comprise values characterizing similarity between respective pairs of the strings associated with the at least one attribute;
applying a thresholding filter to values in the entries of the at least one similarity matrix to create at least one adjacency matrix;
constructing at least one graph network of the plurality of data records based at least in part on the at least one adjacency matrix, wherein the at least one graph network comprises edges connecting pairs of the plurality of data records based at least in part on values of entries in the at least one adjacency matrix;
performing the at least one clustering operation on the at least one graph network to identify one or more clusters of the plurality of data records for the at least one attribute;
determining a degree of connectivity of a given one of the one or more clusters, the degree of connectivity of the given cluster being determined based at least in part on similarity of string values in two or more of the plurality of data records that are part of the given cluster; and
initiating at least one remedial action on one or more information technology assets of the information technology infrastructure responsive to determining that the degree of connectivity of the given cluster exceeds a designated connectivity threshold.

16. The computer program product of claim 15 wherein:
each of the plurality of data records comprises a first string associated with a first attribute and a second string associated with a second attribute;
generating the at least one similarity matrix comprises generating a first similarity matrix for the first strings associated with the first attribute and a second similarity matrix for the second strings associated with the second attribute;
applying the thresholding filter to values in the entries of the at least one similarity matrix to create the at least one adjacency matrix comprises applying a first thresholding filter to values in entries of the first similarity matrix to generate a first adjacency matrix and applying a second thresholding filter to values in entries of the second similarity matrix to generate a second adjacency matrix; and
constructing the at least one graph network of the plurality of data records based at least in part on the at least one adjacency matrix comprises constructing a first graph network based at least in part on the first adjacency matrix and constructing a second graph network based at least in part on the second adjacency matrix.

17. The computer program product of claim 15 wherein:
each of the plurality of data records comprises a first string associated with a first attribute and a second string associated with a second attribute;
the at least one graph network comprises a first graph network for the first attribute and a second graph network for the second attribute;
performing the at least one clustering operation on the at least one graph network comprises identifying a first set of one or more clusters of the plurality of data records in the first graph network for the first attribute and identifying a second set of one or more clusters of the plurality of data records in the second graph network for the second attribute; and
initiating the at least one remedial action is further responsive to identifying a given one of the plurality of data records that is in a first cluster with a first subset of the plurality of data records for the first attribute and is in a second cluster with a second subset of the plurality of data records for the second attribute.

18. A method comprising steps of:
obtaining a plurality of data records associated with an information technology infrastructure, each of the plurality of data records comprising at least one string associated with at least one attribute;
generating at least one similarity matrix for the strings associated with the at least one attribute, wherein entries of the at least one similarity matrix comprise values characterizing similarity between respective pairs of the strings associated with the at least one attribute;
applying a thresholding filter to values in the entries of the at least one similarity matrix to create at least one adjacency matrix;
constructing at least one graph network of the plurality of data records based at least in part on the at least one adjacency matrix, wherein the at least one graph network comprises edges connecting pairs of the plurality of data records based at least in part on values of entries in the at least one adjacency matrix;
performing at least one clustering operation on the at least one graph network to identify one or more clusters of the plurality of data records for the at least one attribute;
determining a degree of connectivity of a given one of the one or more clusters, the degree of connectivity of the given cluster being determined based at least in part on similarity of string values in two or more of the plurality of data records that are part of the given cluster; and
initiating at least one remedial action on one or more information technology assets of the information technology infrastructure responsive to determining that the degree of connectivity of the given cluster exceeds a designated connectivity threshold;
wherein the method is performed by at least one processing device comprising a processor coupled to a memory.

19. The method of claim 18 wherein:
each of the plurality of data records comprises a first string associated with a first attribute and a second string associated with a second attribute;
generating the at least one similarity matrix comprises generating a first similarity matrix for the first strings associated with the first attribute and a second similarity matrix for the second strings associated with the second attribute;

applying the thresholding filter to values in the entries of the at least one similarity matrix to create the at least one adjacency matrix comprises applying a first thresholding filter to values in entries of the first similarity matrix to generate a first adjacency matrix and applying a second thresholding filter to values in entries of the second similarity matrix to generate a second adjacency matrix; and constructing the at least one graph network of the plurality of data records based at least in part on the at least one adjacency matrix comprises constructing a first graph network based at least in part on the first adjacency matrix and constructing a second graph network based at least in part on the second adjacency matrix.

20. The method of claim 18 wherein:

each of the plurality of data records comprises a first string associated with a first attribute and a second string associated with a second attribute;

the at least one graph network comprises a first graph network for the first attribute and a second graph network for the second attribute;

performing the at least one clustering operation on the at least one graph network comprises identifying a first set of one or more clusters of the plurality of data records in the first graph network for the first attribute and identifying a second set of one or more clusters of the plurality of data records in the second graph network for the second attribute; and initiating the at least one remedial action is further responsive to identifying a given one of the plurality of data records that is in a first cluster with a first subset of the plurality of data records for the first attribute and is in a second cluster with a second subset of the plurality of data records for the second attribute.

* * * * *